United States Patent Office 3,373,154
Patented Mar. 12, 1968

3,373,154
PROCESS FOR THE PREPARATION OF
N-AMINO-IMINODIBENZYL
Aaron Cohen and Basil Heath-Brown, Welwyn Garden City, and Carey Ernest Smithen, Ware, England, assignors to Hoffmann-La Roche Inc., Nutley, N.J., a corporation of New Jersey
No Drawing. Filed May 25, 1965, Ser. No. 458,770
Claims priority, application Great Britain, Apr. 14, 1965, 16,041/65
4 Claims. (Cl. 260—239)

The present invention relates to a process for the preparation of N-amino-iminodibenzyl.

N-amino-iminodibenzyl and its acid addition salts are useful as starting materials for the preparation of the iminodibenzyl derivatives of the formula

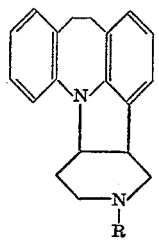

wherein R is lower alkyl, which form the subject matter of copending application Ser. No. 458,766 for Letters Patent entitled, "Compounds, Processes, and Intermediates," in favor of Aaron Cohen and Basil Heath-Brown, filed of even date herewith, and which are useful as antidepressants.

The process of the instant invention is carried out by reacting iminodibenzyl with an alkali metal derivative of dimethyl sulfoxide, treating the reaction product with chloramine in an anhydrous inert solvent to form N-amino-iminodibenzyl, and, if desird, converting the product into an acid addition salt. The alkali metal derivatives of dimethyl sulfoxide can, in turn, be obtained by treating dimethyl sulfoxide with an alkali metal (e.g., sodium or potassium) or an alkali metal hydride (e.g., sodium hydride). The anhydrous inert solvent employed in the reaction with chloramine is preferably an ether, e.g., diethyl ether, or other dialkyl or cycloalkyl ethers, e.g., di- isopropyl ether, tetrahydrofuran, etc. However, other anhydrous inert solvents can be employed such as aromatic hydrocarbons, e.g. benzene and toluene.

The following example illustrates the process of the invention.

Example 5.3 g. (0.11 mole) of a 50 percent sodium hydride dispersion and 60 ml. of dimethyl sulfoxide were heated at 65°–70° C. with stirring under dry nitrogen until evolution of hydrogen had ceased. The mixture was cooled to 30°–40° C., treated slowly with a solution of 19.5 g. (0.10 mole) of dry iminodibenzyl in 60 ml. of dimethyl sulfoxide and stirred at 40° C. for ca. 1.5 hours. The mixture was then treated at ca. 20° C. with 0.10 mole of chloramine in ca. 500 ml. of dry diethylether which was added dropwise over a period of ca. 50 minutes. The color of the solution faded during the addition. The mixture was stirred overnight and then cautiously treated with 300 ml. of water. The aqueous alkaline layer was separated and extracted with ether, the combined ethereal solutions were washed wtih saturated brine to remove traces of dimethyl sulfoxide and were finally treated at 0° C. with 5 N-hydrochloric acid with vigorous agitation. The precipitate was separated, washed with ether and dried to yield 5.0 g. of N-amino-iminodibenzyl hydrochloride.

We claim:

1. A process for the preparation of N-amino-iminodibenzyl comprising the steps of:
   (a) reacting iminodibenzyl with an alkali metal derivative of dimethyl sulfoxide and
   (b) treating the resulting reaction product with chloramine.

2. A process according to claim 1 wherein step (b) is carried out in an anhydrous ether.

3. A process according to claim 1 wherein the alkali metal derivative is a sodium derivative.

4. A process according to claim 2 wherein the ether is diethyl ether.

References Cited

UNITED STATES PATENTS 3,070,596   12/1962   Graefe et al. _____ 260—239

ALTON D. ROLLINS, Primary Examiner.